US009677531B2

(12) United States Patent
Ramamoorthy (10) Patent No.: US 9,677,531 B2
(45) Date of Patent: Jun. 13, 2017

(54) MULTIPHASE INDUCTION MOTOR WITH CONFIGURABLE WINDINGS

(71) Applicant: CATERPILLAR INC., Peoria, IL (US)

(72) Inventor: Krishnakumar D. Ramamoorthy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 436 days.

(21) Appl. No.: 14/502,092

(22) Filed: Sep. 30, 2014

(65) Prior Publication Data

US 2016/0090960 A1  Mar. 31, 2016

(51) Int. Cl.
| | |
|---|---|
| *H02K 3/00* | (2006.01) |
| *F02N 11/08* | (2006.01) |
| *H02K 17/14* | (2006.01) |
| *H02K 3/28* | (2006.01) |
| *H02P 25/18* | (2006.01) |
| *H02P 25/20* | (2006.01) |
| *H02P 25/22* | (2006.01) |
| *F02N 11/04* | (2006.01) |

(52) U.S. Cl.
CPC ........ *F02N 11/0859* (2013.01); *F02N 11/087* (2013.01); *H02K 3/28* (2013.01); *H02K 17/14* (2013.01); *H02P 25/188* (2013.01); *H02P 25/20* (2013.01); *H02P 25/22* (2013.01); *F02N 11/04* (2013.01); *F02N 2011/0877* (2013.01)

(58) Field of Classification Search
CPC .......... H02K 17/06; H02K 3/28; H02K 17/14; H02K 19/12; H02K 19/32; F02N 11/0859; F02N 2011/0877; F02P 25/20

USPC ...................................... 310/71, 198; 290/31
See application file for complete search history.

(56) References Cited

U.S. PATENT DOCUMENTS

| | | | |
|---|---|---|---|
| 4,103,213 A * | 7/1978 | Landgraf | H02K 17/06 310/184 |
| 4,144,470 A | 3/1979 | Auinger | |
| 5,977,679 A | 11/1999 | Miller et al. | |
| 2004/0164636 A1* | 8/2004 | Okamoto | H02K 3/28 310/179 |
| 2011/0210615 A1 | 9/2011 | Unsworth et al. | |

FOREIGN PATENT DOCUMENTS

| | | |
|---|---|---|
| JP | 04-012651 A | 1/1992 |
| JP | 05-316700 A | 11/1993 |
| JP | 06-153472 A | 5/1994 |
| JP | 2001-304001 | 10/2001 |

(Continued)

*Primary Examiner* — Hanh Nguyen
(74) *Attorney, Agent, or Firm* — Finnegan, Henderson, Farabow, Garrett & Dunner, LLP (57) ABSTRACT

An electrical induction motor includes a plurality of windings, and a plurality of contactors. Each of the plurality of contactors is configured to be selectively opened or closed in a circuit including the plurality of windings to selectively connect the windings together in a star configuration wherein current flowing through the windings results in the generation of 2N magnetic poles, with N equal to the number of phases of the motor. Each of the plurality of contactors is also configured to be selectively opened or closed in the circuit including the plurality of windings to selectively connect the windings together in a mesh configuration wherein current flowing through the windings results in the generation of two magnetic poles.

20 Claims, 5 Drawing Sheets

(56) References Cited

FOREIGN PATENT DOCUMENTS

| | | |
|---|---|---|
| JP | 10-98859 | 4/2010 |
| WO | WO 2010/013226 | 2/2010 |
| WO | WO 2013/041202 | 3/2013 |

* cited by examiner

MULTIPHASE INDUCTION MOTOR WITH CONFIGURABLE WINDINGS

TECHNICAL FIELD

The present disclosure relates generally to multiphase induction motors and, more particularly, to multiphase induction motors with configurable windings.

BACKGROUND

Machines, such as, for example, track-type tractors and other off-highway vehicles including construction, agriculture, and mining machines, are used to perform many tasks. To effectively perform these tasks, such machines require a power source that provides significant power to a drive system. The power source may be an engine such as, for example, a turbine engine, diesel engine, gasoline engine, or natural gas engine operated to generate a torque output at a range of speeds. This torque is typically provided to one or more traction devices via a transmission operably connected to the engine via the drive system.

To start such machines, a starter motor with the capability of generating a large amount of torque at low speeds is needed. Often the amount of electrical power required to operate a starter motor for a relatively short period of time can significantly drain the available power in a portable energy storage device such as a battery. In order to maintain sufficient power in the battery for multiple starts of the power source, an electrical generator such as an alternator is often provided to generate the electrical power needed to recharge the battery. If an induction motor is used as both a starter motor and as an alternator to generate electrical power, the induction motor must be able to operate at lower speeds and higher torque when starting the machine, and at higher speeds and lower torque while still generating sufficient power in its capacity as an alternator or generator.

An exemplary induction motor used as both a starter and an alternator is described in U.S. Pat. No. 5,977,679 (the '679 patent) issued to Miller et al. on Nov. 2, 1999. The '679 patent describes an induction motor including a stator having a cylindrical core with a plurality of inner and outer slots and a plurality of toroidal coils wound about the core and laid in the inner and outer slots. The design of the induction motor in the '679 patent is said to enable arbitrary combination of the number of poles and phases of the motor, thus allowing for smooth torque operation in the alternator mode.

Although the induction motor disclosed in the '679 patent may provide some advantages in allowing an induction motor to be used in both a starter mode and as an alternator, the motor still experiences a variety of drawbacks. For example, in order for the induction motor in the '679 patent to transition from engine cranking to alternator mode, the number of phases must be changed to accommodate a change in a number of poles. This required change in the number of phases also results in a significant increase in the electronic complexity of an inverter that is connected to the coils of the motor to allow multiphase operation.

The disclosed systems and methods are directed to overcoming one or more of the problems set forth above.

SUMMARY

In an exemplary embodiment of the present disclosure, an electrical induction motor includes a plurality of windings, and a plurality of contactors. Each of the plurality of contactors is configured to be selectively opened or closed in a circuit including the plurality of windings to selectively connect the windings together in a star configuration wherein current flowing through the windings results in the generation of 2N magnetic poles, with N equal to the number of phases of the motor. Each of the plurality of contactors is also configured to be selectively opened or closed in the circuit including the plurality of windings to selectively connect the windings together in a mesh configuration wherein current flowing through the windings results in the generation of two magnetic poles.

In another exemplary embodiment of the present disclosure, a method is disclosed for configuring an electrical induction motor including a plurality of windings and a plurality of contactors arranged in a circuit including the plurality of windings. The method may include selectively opening or closing each of the plurality of contactors to selectively connect the windings together in a star configuration wherein current flowing through the windings results in the generation of 2N magnetic poles, with N equal to the number of phases of the motor. The method may also include selectively opening or closing each of the plurality of contactors to selectively connect the windings together in a mesh configuration wherein current flowing through the windings results in the generation of two magnetic poles.

In a further exemplary embodiment of the present disclosure, an electrical system for a machine is disclosed. The electrical system may include a three phase inverter and a three phase induction motor. The three phase induction motor may include three terminals configured for connection to three phase outputs from the inverter, a plurality of windings, and a plurality of contactors. Each of the plurality of contactors may be configured to be selectively opened or closed in a circuit including the plurality of windings to selectively connect the windings together in a star configuration wherein current flowing through the windings results in the generation of six magnetic poles. Each of the plurality of contactors may also be configured to be selectively opened or closed in the circuit including the plurality of windings to selectively connect the windings together in a mesh configuration wherein current flowing through the windings results in the generation of two magnetic poles.

DETAILED DESCRIPTION

Figure 1:
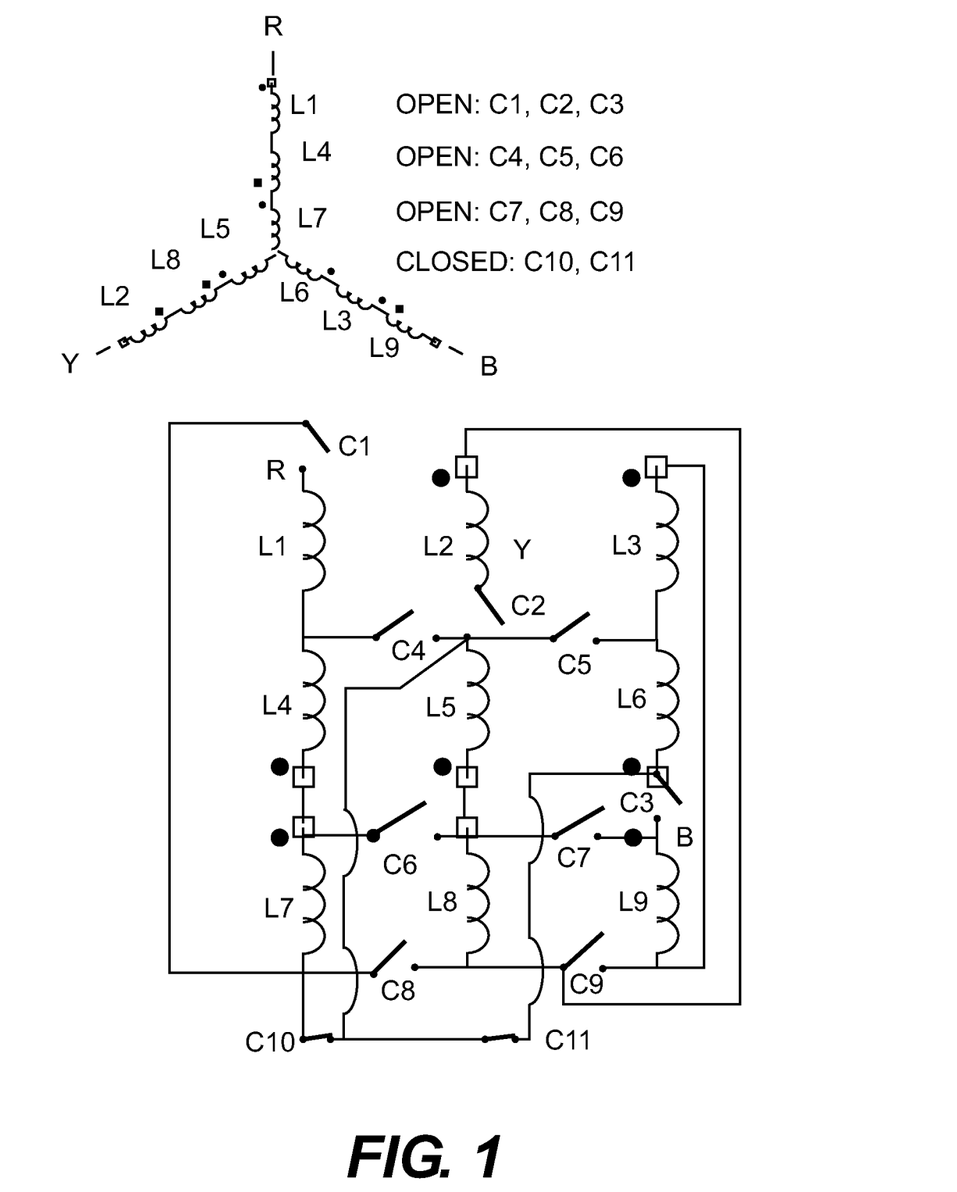
FIG. 1 is an electrical schematic of an exemplary wiring configuration for an electrical induction motor.

FIG. 1 is an electrical schematic of one possible configuration of the electrical connections between the windings in an electrical induction motor adapted for use as both a starter motor and an alternator in a machine. The machine in which the electrical induction motor may be used could include any machine that performs some type of operation associated with an industry such as mining, construction, farming, transportation, or any other industry known in the art.

Figure 3:
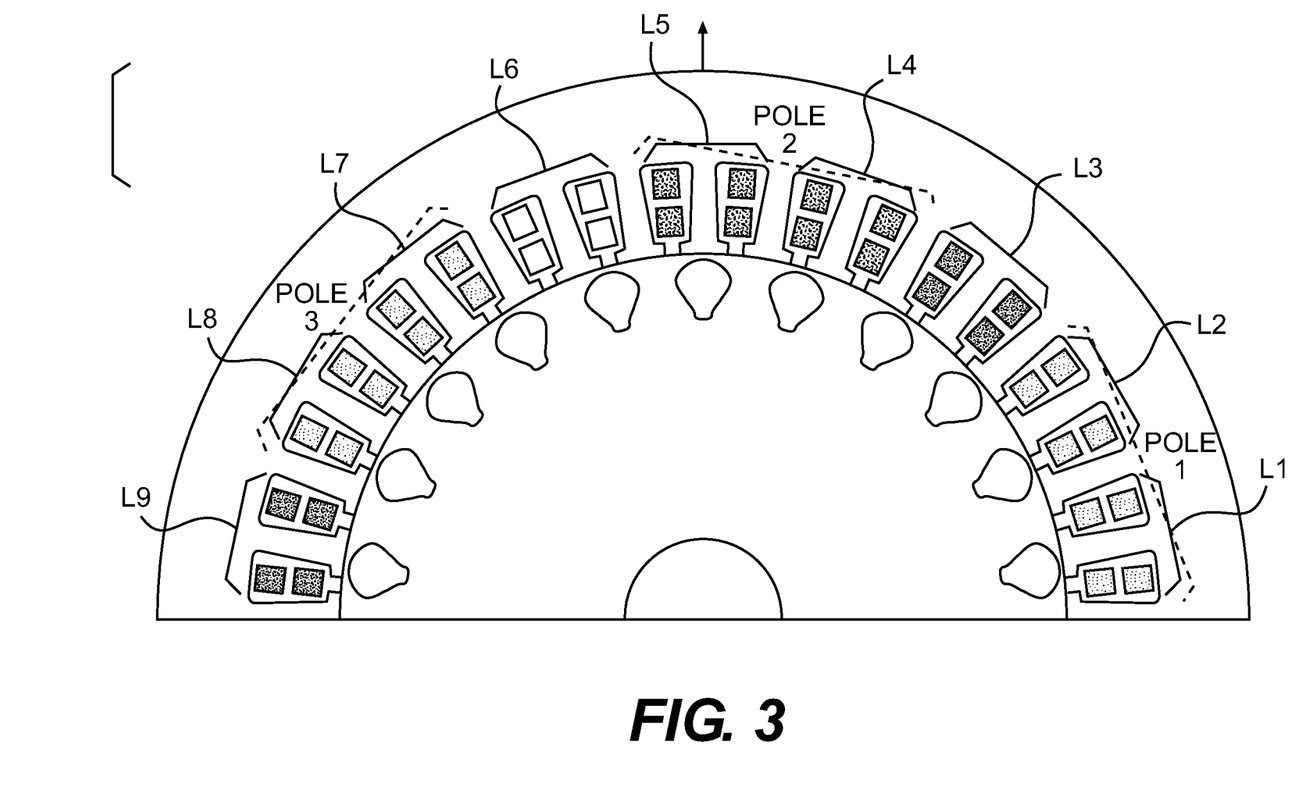
FIG. 3 is a diagrammatic illustration of the configurable windings associated with the configuration illustrated in FIG. 1.

Windings L1-L9 are shown arranged in what is commonly referred to as a star configuration in FIG. 1. In the implementation shown in FIG. 1, the windings are wound on an annular stator (additional features of the stator are left out for clarity) of an alternating current three phase induction motor. A rotor (not shown) may be rotatably mounted within the annular stator. The windings on the stator in the exemplary implementation shown in FIG. 1 are connected in groups of series-connected windings, where each group of series-connected windings is connected at one end to one of three terminals R, Y, or B corresponding to the three outputs of a three phase inverter (not shown). The opposite end of each of the groups of series-connected windings is connected to a common point—generally referred to as the neutral point. The particular sequence in which the windings are connected together in series determines the number of magnetic poles that will be generated when electricity is provided from a three phase inverter to the terminals R, Y, and B. FIG. 3 schematically illustrates a cross section of one half of a stator with windings connected in a star configuration and sequenced as illustrated in FIG. 1. The other half of the stator would be a mirror image of the half shown in FIG. 3. Half of each of the windings L1-L9 are shown in FIG. 3, and three of the six magnetic poles that would result from the circuit shown in FIG. 1 are identified. Alternative implementations may include a multiphase induction motor having N phases, with 3N windings and 2N magnetic poles.

In the arrangement shown in FIG. 1, windings L1, L4, and L7 are connected in series between terminal R and the neutral point, windings L2, L8, and L5 are connected in series between terminal Y and the neutral point, and windings L9, L3, and L6 are connected in series between terminal B and the neutral point. This arrangement of the windings results in a three phase induction motor connected in star configuration with six magnetic poles, three of which are seen in the top half section of the stator illustrated in FIG. 3. FIG. 1 also illustrates the exemplary circuit diagram that results in the star configuration. As shown in the bottom half of FIG. 1, contactors C1-C11 may be configured in a circuit including the nine windings L1-L9 in order to achieve the star configuration. Contactors C1-C9 are all in an open position, and contactors C10 and C11 are closed in order to achieve the star configuration and the desired sequence of windings that results in the three phase, six pole arrangement shown in FIGS. 1 and 3. Current supplied from the inverter to each of the terminals R, Y, and B is the same as the current flowing through each of the series-connected windings, thereby ensuring that each winding receives the total amount of current supplied for each phase by the inverter. The voltage across each of the windings in the star configuration is smaller than the voltage between any two of the inverter terminals since the windings are connected in series between each of the terminals and the neutral point. The voltage between any two of the terminals is therefore equal to the sum of the voltages across each of the windings connected in series between each of the terminals and the neutral point.

Figure 2:
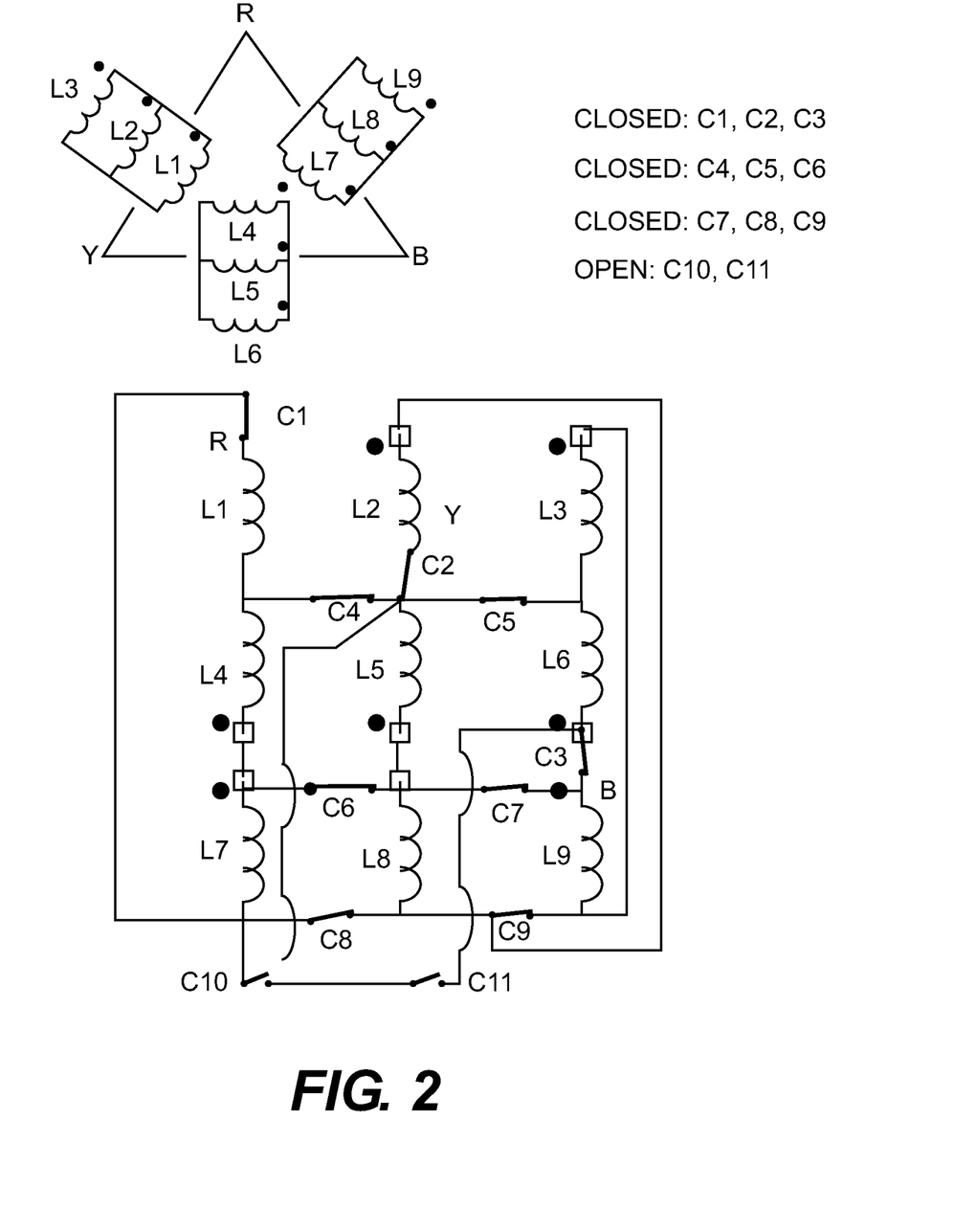
FIG. 2 is an electrical schematic of another exemplary wiring configuration for an electrical induction motor.

FIG. 2 provides an electrical schematic of a second possible configuration for the electrical connections between the windings in the electrical induction motor adapted for use as both a starter motor and an alternator in a machine. In FIG. 2 the windings L1-L9 are connected in what is commonly referred to as a "mesh" configuration. In the case of a three phase motor such as shown in FIG. 2, the mesh configuration may sometimes be referred to as a "delta" configuration. As shown in the electrical schematic of FIG. 2, the mesh configuration is achieved by closing contactors C1-C9 in the circuit including the nine windings L1-L9, and opening contactors C10 and C11. The result in the mesh configuration of FIG. 2 is that a first group of windings L1, L2, L3 are connected in parallel between terminals R and Y, a second group of windings L4, L5, L6 are connected in parallel between terminals Y and B, and a third group of windings L7, L8, L9 are connected in parallel between terminals B and R. Current supplied to the windings from any one of the terminals R, Y, B connected to an inverter is therefore split between two separate groups of parallel-connected windings. The split in the current in the mesh configuration of FIG. 2 results in a lower current being supplied to the individual windings in the mesh configuration of FIG. 2 than is supplied to the windings in the star configuration of FIG. 1. However, the voltage provided across each of the windings in the mesh configuration of FIG. 2 is greater than the voltage provided across each of the windings in the star configuration of FIG. 1. This is because each of the parallel-connected windings in the mesh configuration sees the full amount of voltage between two of the terminals connected to an inverter. Windings L1, L2, L3 each see the full amount of voltage between terminals R and Y, windings L4, L5, L6 each see the full amount of voltage between terminals Y and B, and windings L7, L8, L9 each see the full amount of voltage between terminals B and R.

In one exemplary implementation the operating voltage that may be provided by the three phase inverter across each of the terminals R, Y, and B at the three phase induction motor may be approximately 48 V (DC). The amount of inverter current supplied to the windings of the induction motor during starting mode may be approximately 833 amps (RMS). The continuous current provided by the inverter to the induction motor windings when the induction motor is in an alternating mode of operation may be approximately 78 amps (RMS). A typical speed of rotation of the induction motor during the starting mode may be approximately 100 RPM for a three phase, six pole induction motor, while the speed of rotation during alternating mode may be approximately 15,000 RPM.

The impedance of the circuits shown schematically in FIGS. 1 and 2 changes as the mechanical load and rotational velocity of the electrical induction motor changes Impedance is a measure of the opposition that the circuit presents to a current as a voltage is applied. The amount of torque (load) that the motor can produce is proportional to the amount of current flowing through each of the windings. The rotational velocity of the motor is proportional to the voltage provided across each of the windings. Therefore, the star configuration of FIG. 1 may be implemented when low speed rotation of the motor and high output of torque is desired, such as when starting the machine, since the star configuration results in the most current flowing through each winding. More current flowing through each of the windings results in more torque being produced. Increasing the number of magnetic poles of the motor also increases the amount of torque produced by the motor. The star configuration illustrated in FIG. 1 increases the number of poles as a result of the sequence in which the windings are connected in series between each terminal and the neutral point.

Figure 4:
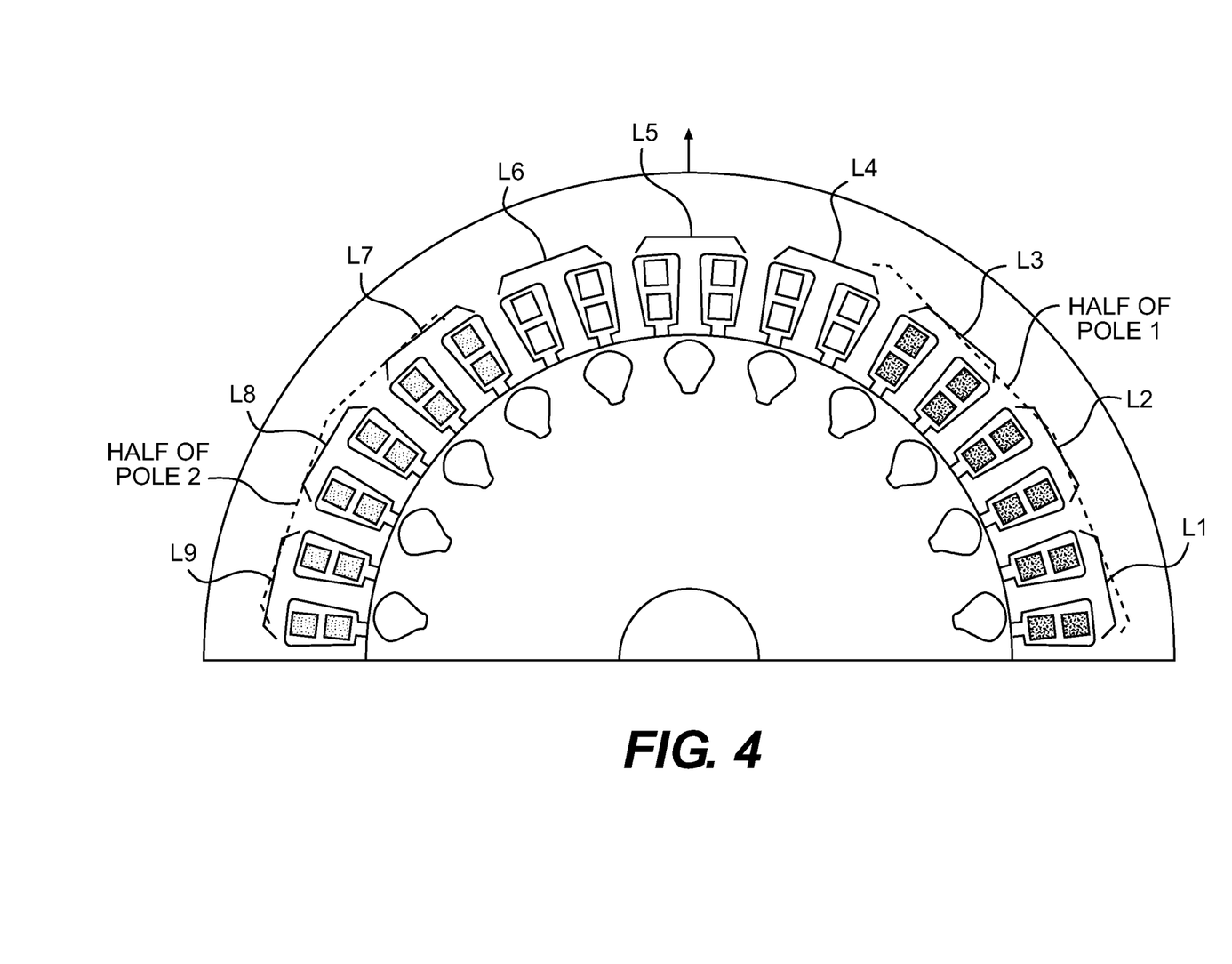
FIG. 4 is a diagrammatic illustration of the configurable windings associated with the configuration illustrated in FIG. 2.

When the motor is used in an alternating or generating mode the motor may be operated at higher speeds than when in starting mode, and at a lower torque output, while still producing the same or substantially the same power output. As discussed above, in one exemplary implementation the rotating speeds may go from approximately 100 RPM during starting to 15,000 RPM when in alternating mode. To achieve the preferred configuration for the high speed, low torque requirements in an alternating mode of operation, the motor may be switched from the star configuration of FIG. 1 to the mesh configuration of FIG. 2. As discussed above, the switch from star configuration to mesh configuration is achieved by closing the contactors C1-C9, and opening contactors C10 and C11, as shown in the circuit diagrams of FIGS. 1 and 2. The result is a higher voltage across each of the windings, and greater speed of rotation of the motor. The number of poles can also be reduced from six poles in the star configuration of FIGS. 1 and 3 to two poles in the mesh configuration of FIGS. 2 and 4. This reduction in the number of poles is also achieved as a result of the sequence in which current flows through the parallel-connected windings between each of the inverter terminals, as shown in FIG. 2. The reduction in the number of poles results in a higher voltage being provided to each of the windings in the mesh configuration without an increase in the total voltage seen across each of the pairs of terminals R-Y, Y-B, and B-R. In the exemplary implementation discussed above, the phase voltage across each of the pairs of terminals may remain at approximately 48 volts, while the voltage across each of the individual windings may rise to several hundred volts. If the number of poles were kept the same when switching from a star configuration to a mesh configuration, and the motor was operated at high speeds such as 15,000 RPM in the alternating mode, the result would be a significant increase in the voltage across each of the pairs of terminals connected to an inverter.

In the case of a three phase, six pole induction motor, switching from a star configuration for low speed (e.g., approximately 100 RPM), high torque operation to a mesh configuration for high speed (e.g., approximately 15,000 RPM), low torque operation could result in an increase in the voltage across each pair of inverter terminals from approximately 48 volts to several hundred volts. This increase may also result in safety regulations requiring an operator of the machine to qualify for high voltage operation. However, the reduction in the number of poles when switching from the star configuration to the mesh configuration in accordance with various implementations of this disclosure, enables higher speed, lower torque operation without an increase in the voltage across the inverter terminals. The reduction in the number of poles may also result in a significant decrease in the amount of current flowing through each of the windings. As one non-limiting example, a three phase, six pole induction motor may experience approximately 450 amps of current flowing through the windings if the speed of rotation is increased to 15,000 RPM without changing the number of poles. However, by reducing the number of poles from 6 poles to 2 poles, the amount of current flowing through the windings can be limited to approximately 78 amps. This may improve the efficiency of the motor as a result of the concurrent reduction in resistive losses that occur at higher current flows in accordance with Ohm's Law: $P=I^2R$.

A three phase inverter (not shown) connected to the alternating current induction motor at each of terminals R, Y, and B may be capable of supplying alternating current of variable voltage and variable frequency to the motor. The inverter may also be used with the induction motor when the induction motor is functioning as an alternating current generator. The inverter may embody a single microprocessor or multiple microprocessors, along with hardware including other electronic components such as insulated gate bipolar transistors (IGBT) and comparators that may be included in pulse-width modulation circuits, firmware, and software, or various combinations of all of the above. Various other known circuits may be associated with the inverter, including power supply circuitry, signal-conditioning circuitry, solenoid driver circuitry, communication circuitry, and other appropriate circuitry.

Figure 5:
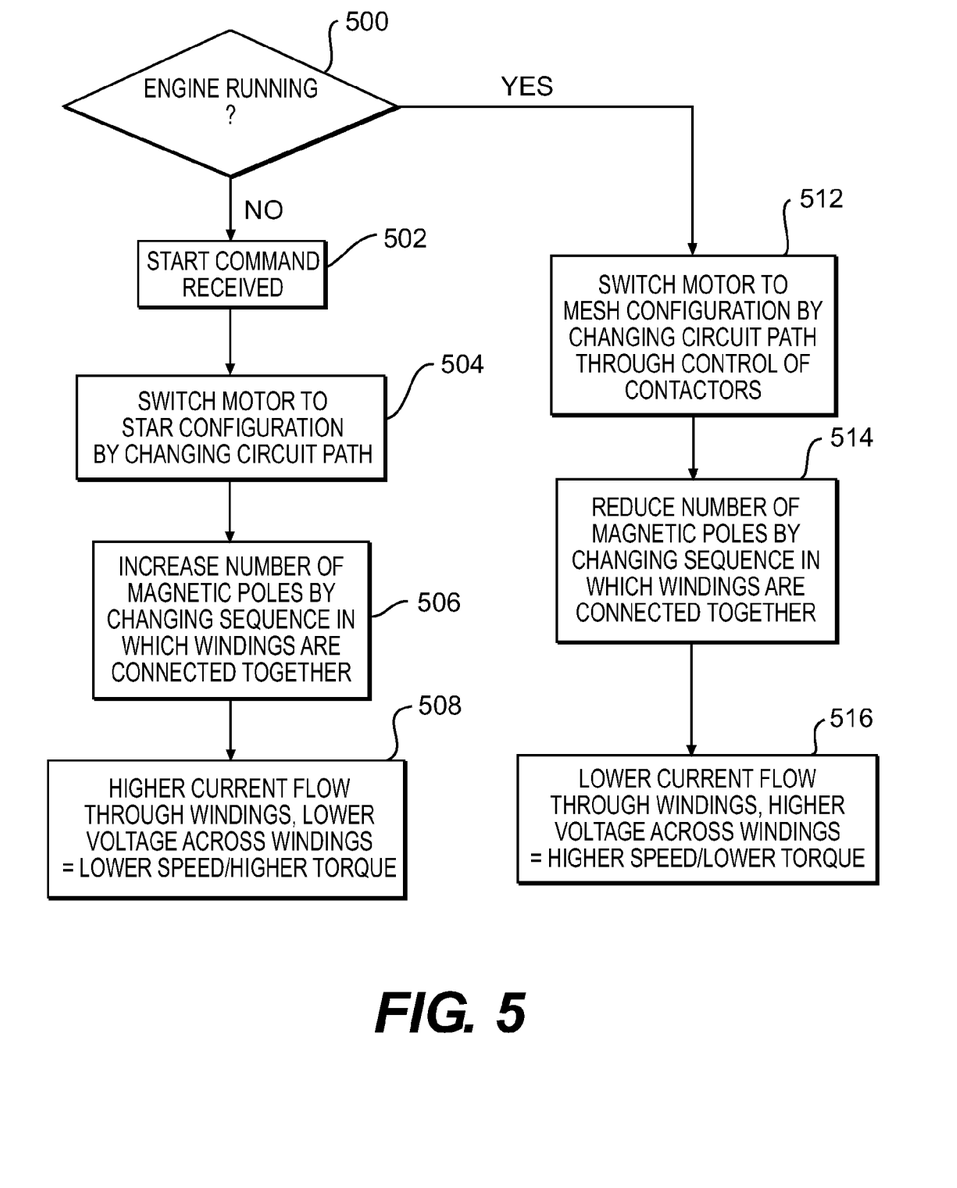
FIG. 5 is a flowchart illustrating an exemplary method of configuring an electrical induction motor.

The flow chart shown in FIG. 5 illustrates an exemplary method of configuring the induction motor shown in FIGS. 1-4, and FIG. 5 will be described in detail in the following section.

INDUSTRIAL APPLICABILITY

The disclosed three phase induction motor with configurable windings may be used as both a starter and as an alternator or generator of electrical power. Induction motors with fewer or more phases than the three phase induction motor may also be used in accordance with the principles set forth in this disclosure. When used as a starter, the induction motor is required to produce sufficient torque for starting the engine of the machine on which it is mounted. The amount of torque that the induction motor can produce may be proportional to the amount of current flowing through each of the windings on the stator. Torque produced may also be proportional to the number of magnetic poles generated by the current flowing through the windings of the motor. In one exemplary implementation, a three phase inverter connected to a three phase induction motor may be configured to receive one or more signals indicative of a request to operate the motor to start an engine. The inverter may then process these signals and send corresponding signals to the three terminals of the three phase induction motor. The induction motor may be configured to receive the one or more signals from the inverter and process the one or more signals in order to selectively open or close each of the plurality of contactors to establish the star configuration and the resulting increase in the amount of current flowing through each winding.

The induction motor may be further configured to receive the one or more signals from the inverter indicative of a request to operate the motor to start an engine. The induction motor may be configured to process the one of more signals in order to selectively open or close each of the plurality of contactors to generate an increase in the number of magnetic poles as a result of the sequence of windings through which the current flows. Therefore, the starting mode of operation of the motor may be achieved by sending larger amounts of current through each of the windings, and by simultaneously generating a higher number of magnetic poles. In the case of a three phase induction motor, the lower speed, higher torque starting mode may be achieved by activating contactors in the circuit including the windings, resulting in a star configuration of the windings, with the sequence of windings through which the current flows resulting in the generation of six magnetic poles.

The induction motor according to various implementations of this disclosure may also be used as an alternator for generating electrical power. During the alternating mode of operation the induction motor may be able to handle higher rotational speeds (e.g., 15,000 RPM) than when starting the engine (e.g., 100 RPM), but at the same time producing less torque than when starting the engine. A tradeoff between higher current and lower voltage at each of the windings during starting mode and higher voltage and lower current at each of the windings during alternating mode results in the total power consumed or produced by the motor remaining approximately the same.

The voltage across each of the windings is proportional to the rotational speed of the motor. Therefore higher rotational speeds translate to higher voltages across each of the windings. A reduction in the number of magnetic poles of the motor (e.g., from 6 poles to 2 poles) results in a larger voltage across each of the windings without an increase in the total voltage seen across each pair of terminals connected to an inverter. In the same exemplary implementation discussed above with regard to using the induction motor in a starting mode, the three phase inverter connected to the induction motor may also be configured to receive one or more signals indicative of a request to operate the motor as an alternator to generate electricity. The inverter may then process these signals and send corresponding signals to the three terminals of the three phase induction motor. The induction motor may be configured to receive the one or more signals from the inverter and process the one or more signals in order to selectively open or close each of the plurality of contactors to establish the mesh configuration and the resulting increase in the voltage across each winding.

The induction motor may be further configured to receive the one or more signals from the inverter indicative of a request to operate the motor as an alternator to generate electricity. The inverter may process the one of more signals in order to selectively open or close each of the plurality of contactors to generate fewer magnetic poles as a result of the sequence of windings through which the current flows when associated contactors are in a closed position. Therefore, the alternating mode of operation of the motor may be achieved by implementing larger voltages across each of the windings, and by simultaneously generating a lower number of magnetic poles. In the case of a three phase induction motor, the higher speed, lower torque alternating mode may be achieved by activating contactors in the circuit including the windings, resulting in a mesh configuration of the windings. The sequence of windings through which the current flows in the mesh configuration may also result in the generation of two magnetic poles.

FIG. 5 illustrates an exemplary method of configuring the induction motor shown in FIGS. 1-4. A first step is to determine whether the engine is running (Step: 500). If the engine is not running (Step: 500=No), then when a start command is received (Step: 502), the induction motor may be switched into a star configuration as shown in FIG. 1 by changing the circuit path by which current flows through the windings of the motor (Step: 504). As shown in the exemplary circuit diagram of FIG. 1, the star configuration in a three phase induction motor may be achieved by opening contactors C1-C9 and closing contactors C10 and C11.

In addition to switching the induction motor to the star configuration shown in FIG. 1, the number of magnetic poles may also be increased by changing the sequence in which the windings are connected together (Step: 506). As shown in the exemplary circuit diagram of FIG. 1, the result is a group of series-connected windings L1, L4, and L7 being connected between terminal R and the neutral point, a second group of series-connected windings L2, L8, L5 being connected between terminal Y and the neutral point, and a third group of series-connected windings L9, L3, L6 being connected between terminal B and the neutral point. The end result of the reconfiguration that follows receipt of a start command at Step: 502 is a higher current flow through each of the windings, and a lower voltage across each of the windings, resulting in lower speed and higher torque operation (Step: 508).

If the engine is running (Step: 500=Yes), the induction motor may be switched into a mesh configuration by changing the circuit path through control of contactors C1-C11 (Step: 512). As shown in the exemplary circuit diagram of FIG. 2, the mesh configuration in a three phase induction motor (also referred to as a delta configuration) is achieved by closing contactors C1-C9 and opening contactors C10 and C11.

In addition to switching the induction motor to the mesh configuration shown in FIG. 2, the number of magnetic poles may also be reduced by changing the sequence in which the windings are connected together (Step: 514). As shown in the exemplary circuit diagram of FIG. 2, the result is a group of parallel-connected windings L1, L2, L3 being connected between terminals R and Y, a second group of parallel-connected windings L4, L5, L6 being connected between terminals Y and B, and a third group of parallel-connected windings L7, L8, and L9 being connected between terminals B and R. The end result of the reconfiguration that follows a determination that the engine is running (Step: 500=Yes) is a lower current flow through each of the windings, and a higher voltage across each of the windings, resulting in higher speed and lower torque operation (Step: 516).

It will be apparent to those skilled in the art that various modifications and variations can be made to the induction motor of the present disclosure. Other embodiments of the induction motor and methods of configuring the induction motor will be apparent to those skilled in the art after consideration of the specification and practice of the methods disclosed herein. It is intended that the specification and examples be considered as exemplary only, with a true scope of the disclosure being indicated by the following claims and their equivalents.

What is claimed is:

1. An electrical induction motor, comprising:
   a plurality of windings;
   a plurality of contactors, each of the plurality of contactors being configured to be selectively opened or closed in a circuit including the plurality of windings to selectively connect the windings together in a star configuration wherein current flowing through the windings results in the generation of 2N magnetic poles, with N equal to the number of phases of the motor; and
   each of the plurality of contactors also being configured to be selectively opened or closed in the circuit including the plurality of windings to selectively connect the windings together in a mesh configuration wherein current flowing through the windings results in the generation of two magnetic poles.

2. The electrical induction motor of claim 1, further including N terminals configured for connection to corresponding N terminals of an N phase inverter.

3. The electrical induction motor of claim 2, wherein the windings are connected together in N groups of series-connected windings, each of the N groups of series-connected windings being connected between one of the N terminals and a neutral point common to all N groups of series-connected windings such that the same current flows through all of the windings, and the sequence of windings through which the current flows results in the generation of 2N magnetic poles.

4. The electrical induction motor of claim 2, wherein the windings are connected together in N groups of parallel-connected windings, each of the N groups of parallel-connected windings being connected between two of the N terminals such that current supplied from each of the N terminals of the N phase inverter is split between two of the N groups of parallel-connected windings and such that the same voltage is provided across each of the windings, and the sequence of windings through which the current flows results in the generation of two magnetic poles.

5. The electrical induction motor of claim 1, further configured to receive one or more signals indicative of a request to operate the motor to start an engine, and configured to process the one or more signals in order to selectively open or close each of the plurality of contactors to establish the star configuration.

6. The electrical induction motor of claim 1, further configured to receive one or more signals indicative of a request to operate the motor to start an engine, and configured to process the one of more signals in order to selectively open or close each of the plurality of contactors to generate the 2N magnetic poles as a result of a sequence of windings through which the current flows when associated contactors are in a closed position.

7. The electrical induction motor of claim 1, further configured to receive one or more signals indicative of a request to operate the motor as an alternator to generate electricity, and configured to process the one or more signals in order to selectively open or close each of the plurality of contactors to establish the mesh configuration.

8. The electrical induction motor of claim 1, further configured to receive one or more signals indicative of a request to operate the motor as an alternator to generate electricity, and configured to process the one of more signals in order to selectively open or close each of the plurality of contactors to generate the two magnetic poles as a result of the sequence of windings through which the current flows when associated contactors are in a closed position.

9. The electrical induction motor of claim 1, wherein N=3.

10. A method of configuring an electrical induction motor including a plurality of windings and a plurality of contactors arranged in a circuit including the plurality of windings, the method comprising:
selectively opening or closing each of the plurality of contactors to selectively connect the windings together in a star configuration wherein current flowing through the windings results in the generation of 2N magnetic poles, with N equal to the number of phases of the motor; and
selectively opening or closing each of the plurality of contactors to selectively connect the windings together in a mesh configuration wherein current flowing through the windings results in the generation of 2 magnetic poles.

11. The method of claim 10, further including connecting the plurality of windings to N terminals configured for connection to corresponding N terminals of an N phase inverter.

12. The method of claim 11, wherein the windings are connected together in N groups of series-connected windings, each of the N groups of series-connected windings being connected between one of the N terminals and a neutral point common to all N groups of series-connected windings such that the same current flows through all of the windings, and the sequence of windings through which the current flows results in the generation of 2N magnetic poles.

13. The method of claim 11, wherein the windings are connected together in N groups of parallel-connected windings, each of the N groups of parallel-connected windings being connected between two of the N terminals such that current supplied from each of the N terminals of the N phase inverter is split between two of the N groups of parallel-connected windings and such that the same voltage is provided across each of the windings, and the sequence of windings through which the current flows results in the generation of 2 magnetic poles.

14. The method of claim 10, further including:
receiving one or more signals indicative of a request to operate the motor to start an engine; and
processing the one or more signals in order to selectively open or close each of the plurality of contactors to establish the star configuration.

15. The method of claim 10, further including:
receiving one or more signals indicative of a request to operate the motor to start an engine; and
processing the one of more signals in order to selectively open or close each of the plurality of contactors to generate the 2N magnetic poles as a result of a sequence of windings through which the current flows when associated contactors are in a closed position.

16. The method of claim 10, further including:
receiving one or more signals indicative of a request to operate the motor as an alternator to generate electricity; and
processing the one or more signals in order to selectively open or close each of the plurality of contactors to establish the mesh configuration.

17. The method of claim 10, further including:
receiving one or more signals indicative of a request to operate the motor as an alternator to generate electricity; and
processing the one of more signals in order to selectively open or close each of the plurality of contactors to generate the 2 magnetic poles as a result of the sequence of windings through which the current flows when associated contactors are in a closed position.

18. An electrical system for a machine, the electrical system comprising:
a three phase inverter; and
a three phase induction motor, the three phase induction motor comprising:
three terminals configured for connection to three phase outputs from the inverter;
a plurality of windings; and
a plurality of contactors, each of the plurality of contactors being configured to be selectively opened or closed in a circuit including the plurality of windings to selectively connect the windings together in a star configuration wherein current flowing through the windings results in the generation of six magnetic poles, and
each of the plurality of contactors also being configured to be selectively opened or closed in the circuit including the plurality of windings to selectively connect the windings together in a mesh configuration wherein current flowing through the windings results in the generation of two magnetic poles.

19. The electrical system of claim 18, wherein the windings are connected together in three groups of series-connected windings, each of the three groups of series-connected windings being connected between one of the three terminals and a neutral point common to all three groups of series-connected windings such that the same current flows through all of the windings, and the sequence of windings through which the current flows results in the generation of six magnetic poles.

20. The electrical system of claim 18, wherein the windings are connected together in three groups of parallel-connected windings, each of the three groups of parallel-connected windings being connected between two of the three terminals such that current supplied from each of the three terminals of the three phase inverter is split between two of the three groups of parallel-connected windings and such that the same voltage is provided across each of the windings, and the sequence of windings through which the current flows results in the generation of two magnetic poles.

* * * * *